B. F. GREIMANN.
GAGE ATTACHMENT FOR PLANTERS.
APPLICATION FILED MAY 1, 1912.
1,052,479.
Patented Feb. 11, 1913.
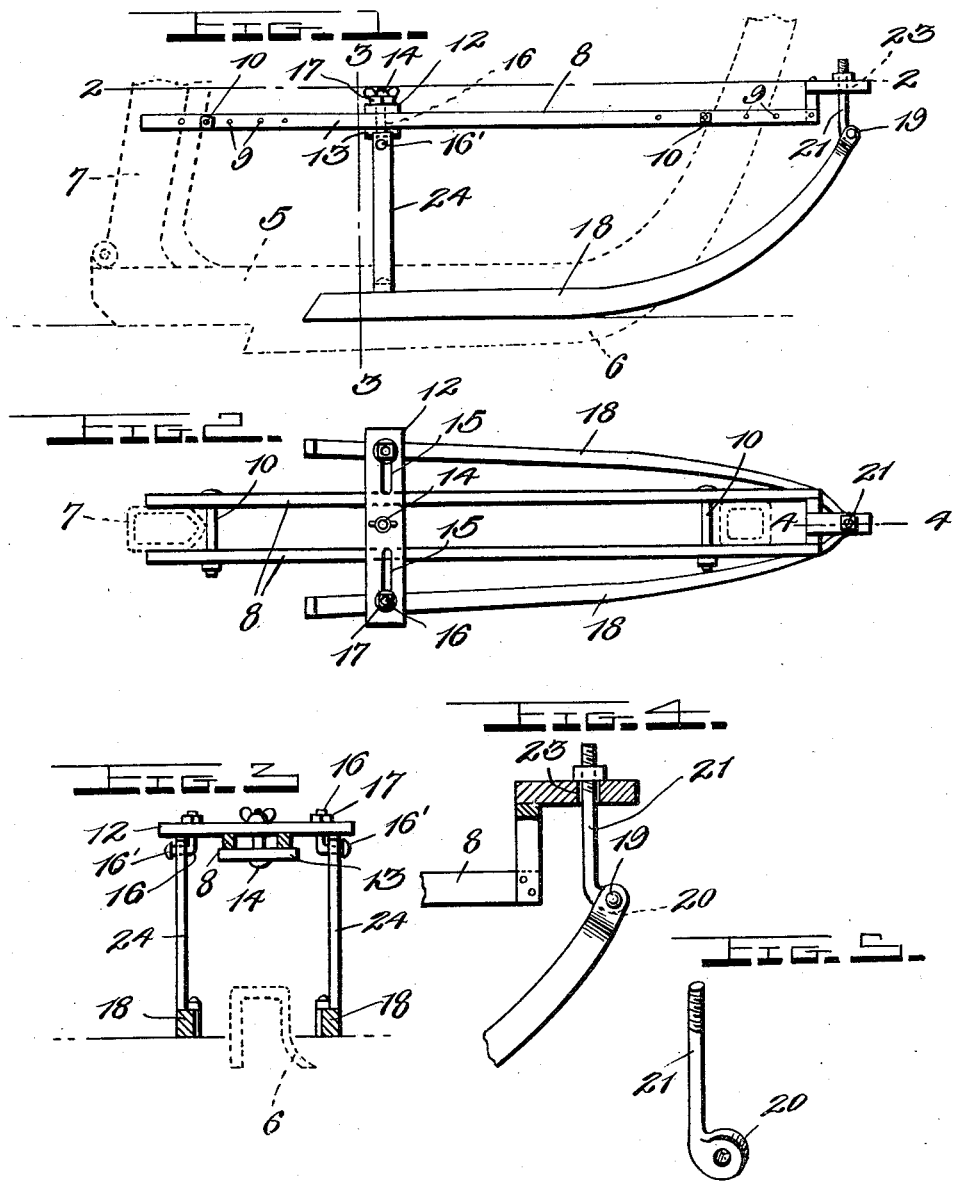
Witnesses
Chas. L. Griebauer.
A. B. Norton.
Inventor
B. F. Greimann,
By Watson E. Coleman
Attorney

UNITED STATES PATENT OFFICE.

BENJAMIN F. GREIMANN, OF GARNER, IOWA.

GAGE ATTACHMENT FOR PLANTERS.

1,052,479.  Specification of Letters Patent.  Patented Feb. 11, 1913.

Application filed May 1, 1912. Serial No. 694,475.

*To all whom it may concern:*

Be it known that I, BENJAMIN F. GREIMANN, a citizen of the United States, residing at Garner, in the county of Hancock and State of Iowa, have invented certain new and useful Improvements in Gage Attachments for Planters, of which the following is a specification, reference being had to the accompanying drawings.

This invention relates to an improved gage for planting machines and has for its primary object to provide a simple, efficient, and quickly adjustable device for application to the shoe of a planting machine whereby the depth to which the furrow opening runner of the shoe enters the ground, may be regulated as desired.

Another object of the invention is to provide a gage for the above purpose detachably and adjustably mounted upon the planting or furrow opening shoe, said gage having oscillating movement in a vertical plane so that the same can ride over obstructions in the path of movement of the shoe, thereby avoiding liability of damage to the gage.

Still another object of the invention resides in the provision of a gage for seed planting machines which consists of comparatively few elements which are reliable and efficient in their action, strong and durable in construction and may be manufactured and applied to planting machines of the ordinary construction at a nominal cost.

With the above and other objects in view the invention consists in the novel features of construction and in the arrangement and combination of parts hereinafter more fully described, pointed out in the claims and shown in the accompanying drawings in which, Figure 1 is a side elevation showing a gage embodying the present invention attached to the shoe of a planting machine; Fig. 2 is a section taken on the line 2—2 of Fig. 1; Fig. 3 is a section taken in the line 3—3 of Fig. 1; Fig. 4 is a detail section taken on the line 4—4 of Fig. 2; and Fig. 5 is a detail perspective view of the supporting rod for the forward ends of the gage runners.

Referring in detail to the drawings 5 designates the shoe of the planting machine which includes the usual furrow opening runner 6 and the depositing spout or tube 7 which is connected to the rear end of said runner.

My improved gage embodies the parallel longitudinally disposed clamping bars 8 which extend at their forward ends upon opposite sides of the upwardly curved end of the runner 6 and at their rear end are disposed upon opposite sides of the seed depositing spout 7. These clamping bars adjacent their ends are provided with a series of bolt receiving openings 9 through which the clamping bolts 10 are adapted to be passed, said bolts being provided upon one of their ends with suitable nuts whereby the bars 8 may be drawn into close clamping engagement upon opposite sides of the shoe. Upon the longitudinal clamping bars 8 at a point intermediate of their ends the transversely disposed bar 12 is arranged, said bar being disposed upon the upper edges of the clamping bars and extending upon opposite sides thereof. A plate 13 is arranged beneath the bar 12 and is engaged at its ends upon the lower edges of the clamping bars 8. A bolt 14 is removably disposed through the bar 12 and plate 13 to connect and rigidly secure the same upon the bars 8. In each end of the bar 12 a longitudinal slot 15 is provided to receive the upper end of a bolt 16, the lower end of which is horizontally disposed or bent at a right angle as indicated at 16'. Nuts 17 are threaded upon the upper ends of the bolts 16 to adjustably secure the same in the slots on the bar 12.

The gage runners 18 are disposed upon opposite sides of the furrow opening runner 6 of the planting shoe and are divergently disposed from their front to their rear ends. The forward ends of these gage runners are upwardly curved and are connected by means of a bolt 19 which is disposed through an eye 20 on the lower end of the bolt 21. This bolt is loosely disposed at its upper end through an opening provided in the plate 23 which is secured between the forward extremities of the clamping bars 8. To the rear ends of the gage runners 18 the standards 24 are rigidly fixed at their lower ends, the upper ends of said standards being loosely mounted for swinging movement upon the angularly disposed lower ends 16′ of the bolts 16. It will be understood that the connecting plate 19 between the forward ends of the runners 18 is sufficiently resilient to permit said runners to be spread apart as the bolts 16 are adjusted in the slots of the transverse bar 12. This adjustment of the runners is desirable, as in operation upon soils of different character, the runners must be spaced farther from or nearer to the furrow opening runner 6, of the shoe in order to properly maintain the same in position.

From the foregoing description the manner of application and operation of my improved gage will be clearly understood.

In the movement of the machine over the field, the runner 6 of the shoe is maintained and supported in a constant position with relation to the ground surface so that the furrow which is opened by said runner will be of a uniform depth. In the event that the gage runners 18 encounter rubbish, rocks or other obstructions in their path, the forward ends of said runners will move upwardly and ride over said obstructions, the bolt 21 moving freely through the opening in the plate 23. The upper ends of the standards 24 will swing upon the lower angular ends 16′ of the bolts 16. In this manner liability of injury to the gage or shoe runner is prevented. The divergently disposed runners 18 of the gage also act to deflect the rubbish or other matter and prevent the same from accumulating beneath the shoe runner. By loosening the bolts 10 which connect the clamping bars 8 said bars may be easily and quickly raised or lowered upon the shoe so that a furrow of the desired depth will be formed. When the bars 8 are securely clamped upon the shoe, the gage will be rigidly held in position and will not be displaced by engagement with obstructions in the path of movement of the machine.

A planter gage constructed in the manner above described may be easily and quickly applied to planters of the common construction now in general use and owing to its extremely simple form, it will be obvious that the entire device can be manufactured at small cost. The gage is also extremely durable and efficient in practical use.

While I have shown and described the preferred construction and arrangement of the various elements, it will be understood that the invention is susceptible of considerable modification without departing from the essential features or sacrificing any of the advantages thereof.

What I claim is:—

1. The combination with a planter shoe, of a gage comprising parallel bars and means for detachably clamping the same to the shoe, and a pair of rearwardly diverging gage runners mounted upon said bars for vertical oscillatory movement, said runners engaging the ground surface to support the shoe runner whereby a furrow of uniform depth is formed.

2. The combination with a planter shoe, of a gage comprising rearwardly diverging runners to engage the ground surface and support the shoe runner whereby a furrow of uniform depth is formed, and means for vertically adjusting the gage runners upon the shoe whereby the depth of the furrow may be regulated.

3. The combination with a planter shoe, of a gage comprising rearwardly diverging runners arranged upon opposite sides of the shoe, means for mounting said runners at their front and rear ends for vertical oscillatory movement, and means for adjusting the gage runners bodily in a vertical plane whereby the depth of the furrow cut by the shoe runner may be regulated.

4. The combination with a planter shoe, of a gage comprising rearwardly diverging runners arranged upon opposite sides of the shoe, means for bodily adjusting said runners vertically upon the shoe to regulate the depth of the furrow cut by the shoe runner, and means for adjusting the gage runners toward and from the shoe runner.

5. The combination with a planter shoe, of a gage comprising rearwardly diverging runners mounted upon said shoe on opposite sides thereof to support the shoe runner whereby a furrow of uniform depth is formed, and means for adjusting the gage runners toward and from the shoe runner.

6. The combination with a planter shoe, of a gage comprising attaching bars, means for removably attaching said bars to the shoe, rearwardly diverging supporting runners arranged on opposite sides of the planter shoe, means connecting the forward ends of said runners to the attaching bars for oscillatory movement, and means for supporting the rear ends of the runners from said attaching bars and adjusting said runners toward and from the shoe runner.

7. The combination with a planter shoe, of a gage comprising parallel bars, means for detachably clamping said bars to the shoe, rearwardly diverging runners arranged upon opposite sides of the shoe, a supporting bolt for the forward ends of said runners loosely mounted upon the forward ends of the clamping bars for vertical movement, a transverse bar removably secured upon the clamping bars intermediate their ends, bolts longitudinally adjustable in the ends of said transverse bar, and standards connected to the rear ends of said runners and hingedly mounted upon the lower ends of the said adjustable bolts.

In testimony whereof I hereunto affix my signature in the presence of two witnesses.

BENJAMIN F. GREIMANN.

Witnesses:
C. R. SWEIGARD,
E. M. BARZ.

Copies of this patent may be obtained for five cents each, by addressing the "Commissioner of Patents, Washington, D. C."